(12) United States Patent
Sarkar

(10) Patent No.: US 7,263,095 B1
(45) Date of Patent: Aug. 28, 2007

(54) METHOD AND APPARATUS FOR PROVIDING QUALITY OF SERVICE THROUGH MULTIPLE CARRIER IP NETWORKS

(75) Inventor: Falguni Sarkar, Redmond, WA (US)

(73) Assignee: Cingular Wireless II LLC, Atlanta, GA (US)

( * ) Notice: Subject to any disclaimer, the term of this patent is extended or adjusted under 35 U.S.C. 154(b) by 772 days.

(21) Appl. No.: 10/776,507

(22) Filed: Feb. 12, 2004

(51) Int. Cl.
*H04L 12/66* (2006.01)

(52) U.S. Cl. .................................. 370/352; 370/395.52

(58) Field of Classification Search ................ 370/328, 370/338, 395.52, 352, 395.21; 455/67.11, 455/67.13
See application file for complete search history.

(56) References Cited

U.S. PATENT DOCUMENTS 6,577,648 B1 * 6/2003 Raisanen et al. ........... 370/503
6,912,216 B1 * 6/2005 Smith et al. ................ 370/352

2004/0213210 A1 * 10/2004 Dube et al. ................. 370/352

* cited by examiner

*Primary Examiner*—Nguyen T. Vo
(74) *Attorney, Agent, or Firm*—Amin, Turocy & Calvin, LLP

(57) ABSTRACT

A method and an apparatus to determine the supported quality of service in an anticipated network session between a calling device and a called device that exchange information between at least two independent IP networks. The calling SIP device generates and sends an SIP message to a first IP network, which message is then propagated to a second IP network, and so on. The SIP message includes a desired quality parameter, i.e., maximum delay requested, and an accumulated delay parameter inserted in the body thereof. The accumulated delay parameter is modified by cummulatively adding delays between respective devices and/or networks between the calling and called devices. At the receiving end, the called device compares the requested and accumulated/supported delay, and then reports the results of the comparison back to the calling device via a return acknowledgement packet so that the calling device may decide whether to proceed with or reject the call. The calling and called devices may comprise SIP telephones, data terminals, or multimedia devices.

20 Claims, 5 Drawing Sheets

Prior Art

METHOD AND APPARATUS FOR PROVIDING QUALITY OF SERVICE THROUGH MULTIPLE CARRIER IP NETWORKS

BACKGROUND

This invention relates to Internet communications, but more specifically to a method and an apparatus to assure quality of service ("QoS") of voice or constant bit-rate data at a guaranteed-bandwidth across multiple IP networks, including networks operated by different carriers.

Internet devices use an SIP protocol to establish a session between two users over an IP network. This may involve a multimedia session or a VoIP telephone voice call. Voice calls have a very stringent requirement for delay and jitter to preserve high quality. If the caller and called parties' IP addresses are located in the same carrier's domain, it is easy to engineer the network to meet QoS requirements. If, however, the caller and called party are using different carrier's network, it is difficult to realize whether the link for the established call spanning multiple networks will meet desired quality requirements.

IETF protocol SIP (RFC 3261) describes how to set up a voice call in an IP environment. SIP header contains information about caller, callee, proxy gateways etc. while the SIP body contains information on codec used, type of media, sampling rate used etc. using SDP (Session Description Protocol). But there is typically no framework in a conventional IP network to negotiate end-end QoS when the call is traveling two or more administrative domains (Operators). Negotiating end-to-end QoS will help carriers provide consistent quality for voice calls or multimedia sessions. In cases where consistent quality can not be maintained, the caller and callee may be notified that the call can be set-up but might suffer degraded quality.

VoIP (Voice over Internet Protocol) has a potential for saving significant long haul data transport costs. VoIP implementing SIP (session Internet protocol) is a standard mechanism for supporting voice services and multimedia sessions over IP networks. GSM and UMTS Rel. 5 standards are also based on EP standards and, as such, may conveniently be integrated with IP networks. Because many carriers in United States and elsewhere currently deploy private IP networks to bypass long distance charges of legacy interexchange carriers, VoIP voice calls or multimedia sessions may likely become a preferred mode of data transport.

At present, it is commonplace to use IXCs (Interexchange Carriers) such as those provided by AT&T, Sprint and MCI, to carry long distance calls. These providers deliver calls between and among LECs/WSPs (Local Exchange Carriers/Wireless Service Providers. When the IXCs and LECs/WSPs use VoIP or multimedia sessions (e.g., streaming audio or video) in their respective networks, a mechanism to guarantee end-to-end call quality needs to be established.

As known in the art, voice calls are extremely sensitive to delay and jitter. Telecommunication standards specify that end-to-end latency for a voice call preferably should not exceed about 250 to 400 ms (milliseconds). It has been observed in laboratory environments, however, that degradation of call quality becomes noticeable when jitter or delay exceeds 350 ms. In a mobile to mobile telephone call, for example, delay on the access side of the base station is typically 200 ms. Additional delay results from coding, decoding, and the buffering. Thus, in this case, the network provider must complete the end-to-end call within the remaining 150 ms to stay within acceptable delay tolerance.

A call or multimedia session may transgress multiple independently operated private IP networks. As indicated above, call quality may conveniently be maintained between VoIP mobile telephones of a common carrier sharing the same network since the carrier has direct control over switching and routing. If, however, a call is made from a first subscriber of a first VoIP network to a second subscriber of a second independent VoIP network who may be roaming near a distant network away from his or her home location, bearer traffic must be forwarded from the first to second network and then handed over to the distant network for forwarding to the called party. In such a scenario, the total delay may likely exceed 350 ms for the mobile-to-mobile call. Delay is just one example of call degradation but other quality factors such as jitter, the effect of multiple echo cancellation, etc. may also degrade the call.

In view of the foregoing, the present invention aims to improve call quality conveyed over multiple or independently operated IP network, private or public, thereby to improve message transport quality.

The present invention also aims to improve call quality by enabling a subscriber or his/her equipment, to accept or reject a call through multiple independently operated IP networks based on a minimum acceptable delay or other factors.

It is another feature of the present invention to enable testing of transport quality that may be experienced in a session involving multiple IP networks.

It is another feature of the present invention to ensure call quality when a call travels through multiple networks provided by different service providers or network operators.

In addition to voice calls, the inventive concepts may be adopted for multimedia sessions including music or video transmissions where IP network characteristics or the transport route may impair the data transport quality.

SUMMARY OF THE INVENTION

In accordance with a first aspect of the invention, a method of determining quality of service of an anticipated network session between calling and called devices comprises sending a message from the calling device to a first IP network wherein the message includes a desired quality parameter and an accumulated delay parameter, receiving the message at the first network, modifying the accumulated delay parameter with a first delay between the calling device and the first network, sending the message to a second IP network, secondly modifying the accumulated delay parameter with a second delay between the first and second IP networks, sending the message to the called party, thirdly modifying the accumulated delay parameter with a third delay between the second IP network and the called device, and determining whether quality of service is met for the anticipated network session based on values of the accumulated delay parameter and the desired quality parameter.

In accordance with another aspect of the invention, an apparatus to determine quality of service of an anticipated network session between a calling device and a called device that exchange information between at least two independently operated IP network comprises a calling SIP device that generates and sends a message to a first IP network of two or more independently operated networks wherein the message includes a desired quality parameter and an accumulated delay parameter, the first IP network having an associated processor configured to firstly modify the accumulated delay parameter of the message with a first delay between the calling SIP device and the first IP network, a second IP network having an associated processor configured to secondly modify the accumulated delay parameter of the message with a second delay between the first and second IP networks, a called device that receives the message from the second IP network and that thirdly modifies the accumulated delay parameter with a third delay between the second IP network and the called device, and a routine that determines whether quality of service is met for the anticipated network session based on values of the thirdly modified accumulated delay parameter and the desired quality parameter.

Other aspects and features of the invention will become apparent upon review of the following description taken in connection with the accompanying drawings. The invention, though, is pointed out with particularity by the appended claims.

DESCRIPTION OF ILLUSTRATIVE EMBODIMENTS

The invention enables two or more independently operated networks to communicate QoS requirements and/or to report the ability to achieve QoS requirements for an end-to-end voice call or network session between intercommunicating IP devices, such as an IP telephony device, a data terminal, or other Internet appliance. Generally, method and apparatus aspects of the invention use cumulative information embedded in the body of an IP message initiated by the calling device and a return ACK message transmitted by the called device, which are conveyed during call setup or call negotiation.

Preferably, call setup makes use of an SIP INVITE message that propagates through networks operated by different carries. During message propagation, a time parameter is cumulatively modified as the packet representing the SIP INVITE message transgresses each network. After reaching the called device, the accumulated delay is examined to determine whether the desired time budget has been exceeded. This is accomplished by inserting additional parameters or variables in the body of the SIP INVITE message, preferably to include a fixed or desired INVITE.delay_req parameter and a variable INVITE.acc_delay, which respectively represent the desired time budget and the accumulation of delay during conveyance of a call from the calling device to the called device. Variables utilized during return transmission of an SIP ACK message include an ACK.delay_req parameter, an ACK.delay_supported variable, and indicator variable, which respectively represent the predetermined or desired time budget, the accumulated delay during message transmission, and an indicator indicative of whether the accumulated delay exceeds the predetermined time budget. Upon receipt of the return ACK packet, depending on user desirability or selection, the calling device may proceed with the call with the desired QoS, advise the user of degraded conditions and forego the call, or proceed with the call under the degraded conditions.

Figure 1:
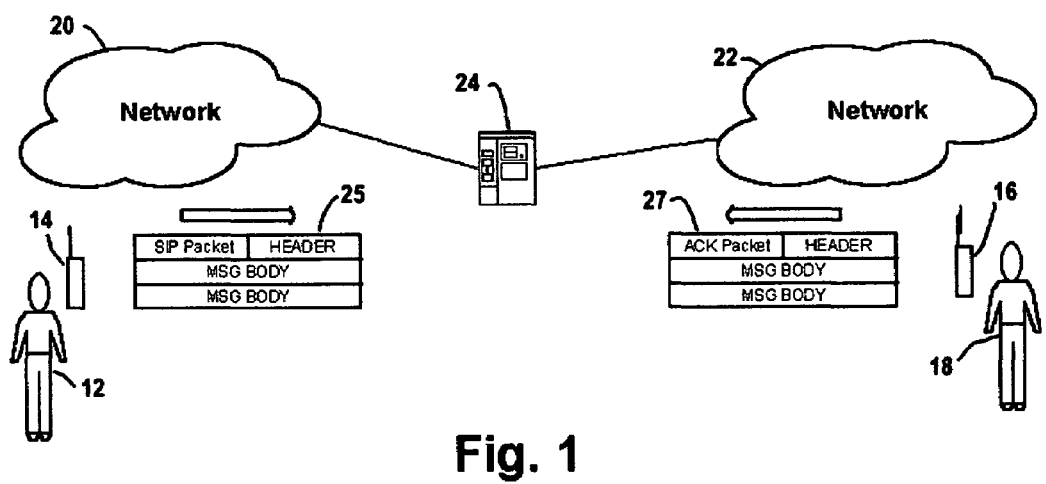
FIG. 1 illustrates an exchange of SIP and ACK packets prior to establishing a session to convey voice or multimedia information across conventional, independent IP domains having a peering arrangement between them.

FIG. 1 illustrates call progression across conventional VoIP networks 20 and 22 operated by different carriers. There, caller 12 using a wireless SIP telephony device 14 in Redmond, Wash., for example, initiates a call from 2060001111 @aws.com to wireless SIP device 16 of called party 18 at 2120001111 @verizonwireless.com, who's home location may be situated in New York. In the illustrated example, called party 18 is roaming in Tampa, Fla. when the call is made. The call initiating SIP device 14 has a wireless link with network 20, which establishes a session with network 22 of the called SIP device 16 via a peering gateway 24. Network 20 has no visibility inside network 22 since they are operated by different carriers.

To complete the call, SIP device 14 sends to network 20 an SIP INVITE message 25 destined for the called party 18 possessing SIP device 16, but does not know how to reach the called party 18. Network 20, recognizing that the call is intended for a party served by a different carrier, sends the SIP packet 25 embodying an SIP INVITE message to peering gateway 24, e.g., the gateway associated with attws.com. As known, the Header block of SIP packet 25 contains routing info (e.g, caller/callee ID, gateways, proxys, etc.) while body, e.g., payload data, contains administrative data (e.g., type of codec, sampling rate, media type, etc.) using session description protocol (SDP). Next, peering gateway 24 forwards the SIP INVITE message to a proxy gateway of network 22. The proxy gateway of network 22 sends a message to calling device 14 that it is trying to reach the called device 16. Based on information contained in a home location register of network 22 as to the whereabouts of called party 18, the proxy gateway of network 22 sends the message to the called party at the roaming location. Next, an ACK packet 27 embodying an SIP ACK message comes back from the roaming location to the calling device 14 via networks 22 and 20. Payload data in the responding ACK packet 27 contains the called party's IP address, which enables the calling party 12 to proceed. In this scenario, there is no indication of quality of service ("QoS") desired or supported in the SIP INVITE or the SIP ACK messages.

Figure 2:
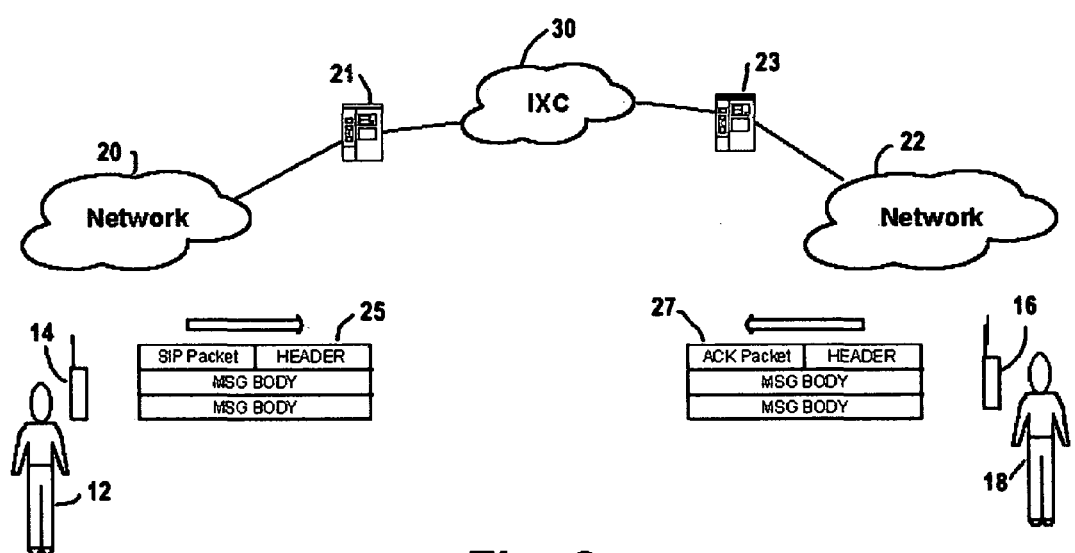
FIG. 2 illustrates an exchange of SIP and ACK packets prior to establishing a session to convey voice or multimedia information across conventional, independent IP domains through a third independent Interexchange carrier.

FIG. 2 illustrates a scenario where an interexchange network 30 is interposed between networks 20 and 22 that lack a peering arrangement between them. In this scenario, the operator or service provider of network 20 uses a third-party interexchange carrier 30 to convey information to network 22. In a first step of call progression, the calling party 12 sends an SIP packet 25 that embodies an INVITE message to called party 18, but does not know how to reach the called party. To initiate the call, calling device 14 sends an SIP INVITE packet 25 to the gateway of network 20. The gateway of network 20 understands that a session is to be established with another provider's network 22 and, in response, forwards the SIP INVITE packet 25 to proxy gateway 21 of interexchange carrier 30. Next, the interexchange carrier 30 forwards the SIP packet 25 to proxy gateway 23, and also sends a message to back to network 20 that it is trying to reach the called party 18. Proxy gateway 23 sends the message to the called party at the known roaming location. Next, an ACK packet 27 embodying an SIP ACK message comes back from device 16 of the called party 18 via networks 22, 30, and 20. Here again, it is not known whether QoS is acceptable after the link is made between the calling and called parties.

The present invention, on the other hand, overcomes the aforementioned drawback by utilizing parts of SIP messages 25 and 27 to store desired and cumulative call quality information and/or to inform the calling party about the anticipated QoS or to insure support of a desired QoS before proceeding with the call (or network session in the case of other multimedia data).

In the body or payload portion of SIP and ACK packets 25 and 27, variables related to call quality requirements are utilized and the networks 20, 22, and/or 30 are configured to act upon these variables to proceed with or forego the call based on QoS desired or QoS encountered when transgressing multiple IP networks that otherwise lack the ability to guarantee QoS. Segments of the call or session, as it progresses the multiple networks, will have a known or an associated time budget. These budgets may be stored in a register or a network peripheral device associated with the networks, and then accessed by operating routines in the gateways or networks to modify the transiting SIP packet in way to cumulatively add the respective time budgets during forwarding of the SIP INVITE packet. The delay associated with the SIP INVITE packet will then indicate the delay of succeeding information packets transmitted during the actual call or network session.

The called device 16 at the receiving end then examines the value of the variables, and particularly examines the value of the cumulative time, to determine if the QoS requirement is met. Routines for examining such values are well within the skill of the ordinary artisan. If the cumulative time exceeds the requested delay, the called device 16 will send back to the calling device 14 an ACK packet indicating a failure or an indication of a quality lower than requested. This enables the call originator 12 the option of accepting the call with lower quality or abandoning the session altogether.

Figure 3:
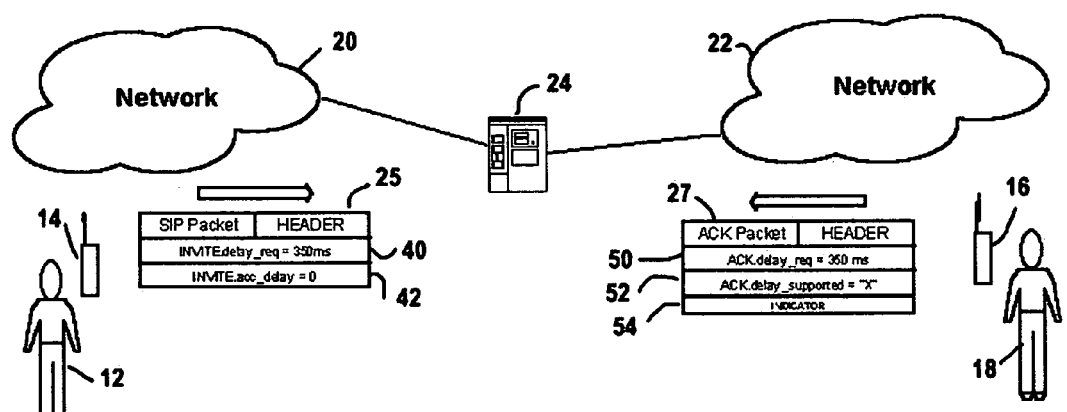
FIG. 3 depicts an arrangement according to an aspect of the invention illustrating an exchange of modified SIP and ACK packets prior to establishing a session to convey voice or multimedia information across independent IP domains having a peering arrangement between them.

FIG. 3 illustrates end-to-end accumulation of delay for a SIP call initiated according to an aspect of the present invention. It is assumed that the end-to-end delay should not exceed 350 ms in order to avoid noticeable degradation in call quality. In some instances, the predetermined delay may be higher or lower according to user selection or desirability, so other requested delay values may obviously be chosen.

In the illustrated example, the INVITE message of SIP packet 25 is provided with two parameters, i.e., INVITE.delay_req 40 and INVITE.acc_delay 42. In the ACK packet 27, the body of the ACK message is provided with three parameters, i.e., ACK.delay_req 50, ACK.delay_supported 52, and indicator 54.

In FIG. 3, wireless network 20 does not have visibility inside wireless network 22, but there exists a peering gateway 24 between the two networks. Calling device 14 of caller 12 desires to send an SIP INVITE message to called party 18 prior to carrying on a VoIP session. In packet 25, which is preferably generated at device 14, the parameter INVITE.delay_req=350 ms and the initial value of the parameter INVITE.acc_delay=0. Caller 12 does not know how to reach party 18, so caller 12 sends the INVITE message 25 to an access gateway of network 20 via device 14. Next, network 20 obtains pre-stored information indicating that the delay in establishing a session between caller 12 and network 20 is 100 ms in which case network 20 modifies the variable INVITE.acc_delay with INVITE.acc_delay+100. Network 20 then forwards the packet 25 to a proxy gateway of network 22 via peering gate 24. Network 22 (or gateway 24) responds by sending a message back to caller 12, via his or her portable wireless SIP phone 14, that network 22 is trying to reach called party 18. Network 22 or a proxy gateway thereof obtains pre-stored information indicating that the delay in establishing a session between network 20 and network 22 is 20 ms, and that the delay to reach party 18 from network 22 is 120 ms. So network 22 first modifies INVITE_acc_delay=INVITE_acc_delay+20 ms. Network 22 also knows that it can reach called party 18 directly without going through any other gateway(s), so again, network 22 modifies INVITE_acc_delay=INVITE_acc_delay+120 ms. This latter step is abandoned in lieu of another accumulation routine if network 22 must go through another gateway to reach the called party 18. The value of INVITE_acc_delay in packet 25 is now 240 ms. The proxy gateway of network 22 now sends the INVITE message to called party 18 at, for example, 2120001111 @verizonwireless.com.

Next, the called party's SIP phone 16 checks the value of INVITE.delay_req and the updated value of INVITE.acc_delay, and then respectively copies them to ACK.delay_req and ACK.delay_supported. Device 16 sets the indicator field 54 to "Y" in ACK packet 27 since delay_supported (i.e., 240 ms) is less than delay_req (i.e., 350 ms). Otherwise the indicator field 54 is set to "N". At this point, ACK packet 27 is sent from SIP device 16 to SIP device 14 via network 22, gateway 24, and network 20. SIP phone 14 at the call originating end checks the value of indicator field 54 in the returned ACK packet. If the indicator field 54 is set to "Y", the call goes through. If the indicator field 54 is set to "N," SIP phone 14 may flash a message prompting caller 12 to decide whether to proceed with the call with higher delay or to abandon the call. Alternative, the accumulated delay alone may be sent back in the ACK packet so that the originating device 14 may determine the value of the indicator 54.

Figure 4:
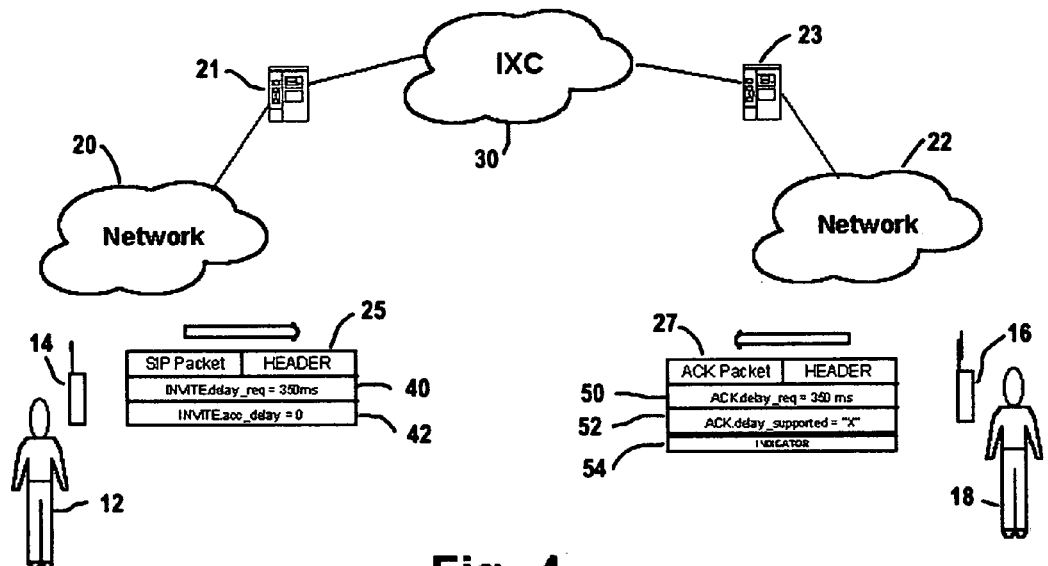
FIG. 4 depicts an arrangement according to another aspect of the invention illustrating an exchange of modified SIP and ACK packets prior to establishing a session to convey voice or multimedia information across independent IP domains that communicate through yet a third independent Interexchange carrier.

FIG. 4 illustrates yet another embodiment of the invention in which intercommunicating networks 20 and 22 do not have a peering arrangement between then, but instead, connect through an interexchange carrier (IXC) 30. In an exemplary call progression, caller 12 desires to send an SIP INVITE message to caller 18 prior to establishing an on-going voice call. Initially, in the SIP INVITE packet 25, the parameters INVITE.delay_req=350 ms and INVITE.acc_delay=0 ms. Caller 12 does not know how to reach called party 18 so the SIP phone 14 of caller 12 sends the SIP INVITE packet 25 to a gateway at of network 20. Next, network 20 obtains information that the delay in establishing a session between SIP phone 14 and the gateway of network 20 is 100 ms. Thereafter, network 20 modifies the parameter INVITE.acc_delay with INVITE.acc_delay+100 ms and forwards the SIP packet containing the modified parameter to the proxy gateway of interexchange network 30. Network 30 sends a message to caller 12, i.e., to device 14, that it is attempting to reach the called party 18. Next, the proxy gateway of IXC network 30 obtains information that the delay in establishing a session between network 20 and network 30 is 40 ms. Thus, IXC network 30 modifies INVITE_acc_delay=INVITE_acc_delay+40 ms. The value of the parameter INVITE_acc_delay is now 140 ms. At this point, IXC network 30 forwards the SIP INVITE packet to network 22 and sends a message to network 20 indicating that it is trying to reach, i.e., establish a session with, the SIP device 16 of caller 18. Next, network 22 obtains information indicating that the delay in establishing a session between networks 30 and 22 is 20 ms, and that the delay to reach called party 18 via SIP device 16 from network 22 is 120 ms. Network 22 then modifies INVITE_acc_delay=INVITE_acc_+20 ms. Network 22 also knows that it can reach caller 18 directly without going through any gateway. So network 22 again modifies INVITE_acc_delay=INVITE_acc_delay+120 ms. This latter step may be abandoned if network 22 must go through another gateway to reach the called party 18. The value of INVITE_acc_delay is now 280 ms. The proxy gateway of network 22 now sends the INVITE message to called party 18 at, for example, 2120001111 @verizonwireless.com.

Next, SIP phone 16 of called party 18 checks the value of INVITE.delay_req 40 and INVITE.acc_delay 42, and copies them to ACK.delay_req 50 and ACK.delay_supported 52. SIP phone 16 sets the indicator field 54 in the ACK packet 27 to "Y" since delay_supported (280 ms) is less than delay_req (350 ms). Otherwise field 54 will be set to "N". Now the ACK packet 27 comes back from network 22 to network 20 via IXC network 30.

Finally, the SIP phone 14 of caller 12 checks the value of the indicator field 54. If indicator field 54 is set to "Y", the call goes through. If field 54 is set to "N," SIP phone 14 can flash a message prompting caller 12 to decide whether to take the call with higher delay or to abandon it altogether.

Figure 5:
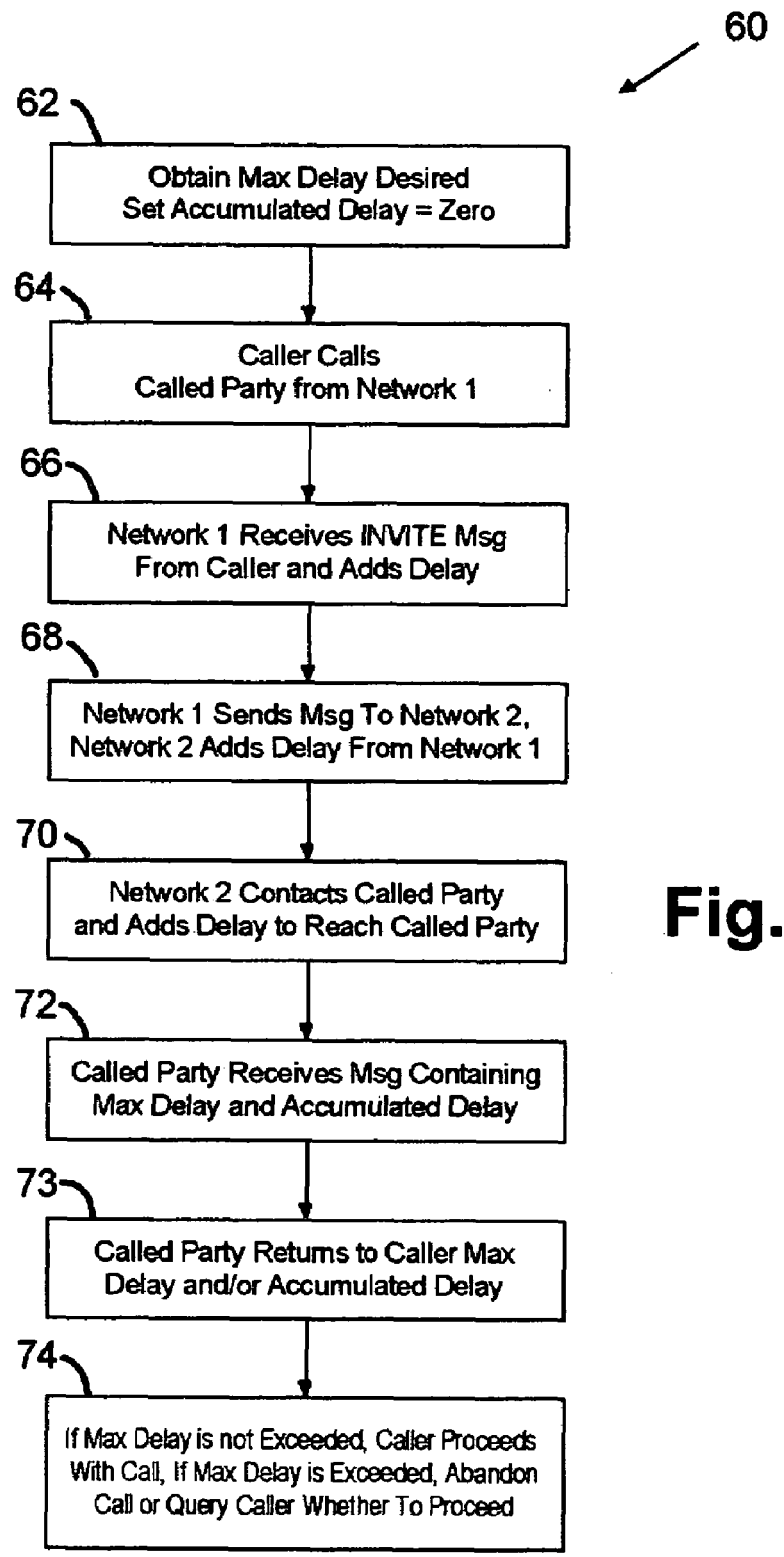
FIG. 5 is a flow diagram illustrating a method aspect of the invention and shows a sequence of steps to test or establish support for conveyance of information at a given quality of service between end-users communicating through two or more independent IP domains.

FIG. 5 depicts a flow diagram 60 illustrating a method aspect of the invention in another form different from that derived from foregoing description. Ordering of steps may be altered from than shown, but at step 62, the maximum delay desired or requested is obtained from a predetermined or selected value. This may be 350 ms. Also, the accumulated delay is initially set to zero. With these parameters at hand, at step 64, a caller initiates a call to a called party from a first network, typically his home network. At step 66, the first network receives an SIP INVITE message generated by the caller. This message contains the desired and accumulated delay parameters. At step 68, first network or an associated device modifies the accumulated delay parameter by adding a delay time between the caller and the first network. Next, at step 68, the first network also sends the INVITE message to the second network, which also modifies the accumulated delay parameter in the INVITE message by adding a delay time to established a session between the first and second networks. If no other networks are interposed between the called party and the second network, the second network contacts the called party at step 70 and further modifies the accumulated delay parameter by adding the time delay between the second network and the called party. At step 72, the called party then receives the INVITE message that includes the max delay desired and the total accumulated delay from the calling party. At step 73, the caller party returns to the caller the max delay desired and/or the total accumulated delay. At step 74, which may be performed at the called party's location, the calling party's location, or elsewhere among the multiple networks, the values of the max delay desired and accumulated delay are compared or tested. If the max delay is not exceeded by the accumulated delay, the call (or network session) may proceed with the desired minimum quality of service. If the accumulated delay exceeds the max delay desired, then the call may be abandoned or the caller may be queried to select whether to abandon the call or proceed under degraded QoS conditions.

The aforementioned arrangement or method of testing or assessing call quality may be altered in a variety of ways. Delays may be measured, detected, or predetermined. In addition, rather than providing a storage register indicative of the respective time budgets directly in the networks or gateway devices thereof, the respective time delays or budges may be (i) estimated based on a characteristic of the IP route, (ii) predetermined based on known properties of the networks and gateway devices (including, for example bridges or access points), (iii) stored locally at each network or gateway device, or (iv) maintained via internetwork control links or otherwise in storage at either end of the network sessions and tested thereat for desired call quality. The multiple networks may be independently operated or commonly operated but otherwise unable to guarantee QoS. Time budgets or delays also may be indicated incremental or discrete, stepped values or by actual measured values. In addition, a message may comprise one or more packets. As such, the invention includes those modifications and variation was may come to those skilled in the art based on the teachings herein.

The invention claimed is:

1. A method of determining quality of service of a network session between a calling device and a called device that convey information over at least two independent IP networks, said method comprising:
   sending a message from the calling device to a first IP network of said at least two independent IP networks, said message including a desired quality parameter and an accumulated delay parameter,
   receiving the message at the first network,
   modifying the accumulated delay parameter with a first delay between the calling device and the first network,
   sending the message to a second IP network of said at least two independent networks,
   secondly modifying the accumulated delay parameter with a second delay between the first and second IP networks,
   sending the message to the called device,
   thirdly modifying the accumulated delay parameter with a third delay between the second IP network and the called device, and
   determining, based on values of the accumulated delay parameter and the desired quality parameter, whether quality of service is met for said network session.

2. The method of claim 1, wherein said desired quality parameter comprises a maximum delay requested between the calling and called devices.

3. The method of claim 2, further including:
   proceeding with the call if call quality is met or querying the caller whether to proceed with the call.

4. The method of claim 3, wherein the calling device and the called device comprise an SIP telephony device, the network session ensues according to a VoIP protocol, and said querying is performed at that calling device by prompting a caller whether to proceed with the call.

5. The method of claim 3, wherein said network session comprises a multimedia session.

6. The method of claim 3, wherein said message comprises an SIP INVITE packet, and said maximum delay and accumulated delay parameters are embodied in the body of the SIP packet.

7. The method of claim 6, further comprising generating an ACK packet from information contained in said SIP INVITE packet, said ACK packet including said desire quality parameter, accumulated delay parameter, and an Indicator indicative of whether the accumulated delay exceeds maximum delay parameter.

8. The method of claim 7, wherein a gateway is interposed between said first and second IP networks, and in said secondly modifying step, said delay indicates time delay between said first and second networks through said gateway.

9. The method of claim 7, wherein an interexchange network is interposed between said first and second IP networks, and in said secondly modifying step, said delay indicates time delay between said first and second networks through said interexchange network.

10. An apparatus to determine quality of service of a network session between a calling device and a called device that exchange information between at least two independent IP networks, said apparatus comprising:
  a calling SIP device that generates and sends a message to a first IP network of said at least two independent networks, said message including a desired quality parameter and an accumulated delay parameter,
  said first IP network having an associated processor configured to firstly modify the accumulated delay parameter of said message with a first delay between the calling SIP device and the first IP network, said first IP network sending the message to a second IP network of said at least two independent networks,
  said second IP network having an associated processor configured to secondly modify the accumulated delay parameter of the message with a second delay between the first and second IP networks,
  a called device that receives the message from the second IP network and that thirdly modifies the accumulated delay parameter of the message with a third delay between the second IP network and said called device, and
  a routine that determines, based on values of the thirdly modified accumulated delay parameter and the desired quality parameter of the message, whether quality of service is met for said anticipated network session.

11. The apparatus of claim 10, wherein said desired quality parameter comprises a maximum delay requested between the calling and called devices.

12. The apparatus of claim 11 wherein said routines enables the calling device to proceed with the call if call quality is met.

13. The apparatus of claim 12 wherein said routines enable the calling device to query the caller whether to proceed with the call if call quality is not met.

14. The apparatus of claim 13 wherein each of the calling device and the called device comprises an SIP telephony device, the anticipated network session occurs according to a VoIP protocol, and said querying is performed at that calling device by prompting a caller whether to proceed with the call.

15. The apparatus of claim 11, wherein said message comprises an SIP INVITE packet and said maximum delay and accumulated delay parameters are embodied in the body of the SIP packet.

16. The apparatus of claim 15, wherein said called device generates an ACK packet from information contained in said SIP INVITE packet, and said ACK packet includes said desire quality parameter, an accumulated delay parameter, and an Indicator indicative of whether the accumulated delay exceeds maximum delay parameter.

17. The apparatus of claim 16, wherein a gateway is interposed between said first and second IP networks, and the second network modifies the accumulated delay parameter to indicate time delay between the first and second networks through said gateway.

18. The apparatus of claim 16, wherein an interexchange network is interposed between said first and second IP networks, and the second network modifies the accumulated delay parameter to indicate time delay between said first and second networks through said interexchange network.

19. The apparatus of claim 10, wherein said network session comprises a multimedia session.

20. The apparatus of claim 10 wherein said routine is located at one of the called and calling devices to perform said determining.

* * * * *